(12) United States Patent
Chen et al.

(10) Patent No.: US 12,483,039 B2
(45) Date of Patent: Nov. 25, 2025

(54) POWER CONVERSION APPARATUS AND CONTROL METHOD

(71) Applicant: Huawei Digital Power Technologies Co., Ltd., Shenzhen (CN)

(72) Inventors: Aitang Chen, Shanghai (CN); Dili Zhu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 17 days.

(21) Appl. No.: 18/584,765

(22) Filed: Feb. 22, 2024

(65) Prior Publication Data

US 2024/0291283 A1 Aug. 29, 2024

(30) Foreign Application Priority Data

Feb. 23, 2023 (CN) .......................... 202310193507.2

(51) Int. Cl.
*H02J 3/46* (2006.01)
*H02J 3/00* (2006.01)
*H02J 3/01* (2006.01)

(52) U.S. Cl.
CPC .............. *H02J 3/46* (2013.01); *H02J 3/0075* (2020.01); *H02J 3/01* (2013.01); *H02J 2300/26* (2020.01)

(58) Field of Classification Search
CPC .. H02J 3/00075; H02J 3/01; H02J 3/46; H02J 2300/26
USPC ........................................................... 307/29
See application file for complete search history.

(56) References Cited

U.S. PATENT DOCUMENTS 9,502,895 B1 * 11/2016 Casey .................... H10F 77/955
12,199,522 B2 * 1/2025 Xu .......................... H02S 40/32

\* cited by examiner

*Primary Examiner* — Hal Kaplan
(74) *Attorney, Agent, or Firm* — Slater Matsil, LLP

(57) ABSTRACT

A power conversion apparatus including a first direct current conversion module, a second direct current conversion module, and a control module. The control module is configured to: in response to an output voltage of the first photovoltaic string being greater than an output voltage of the second photovoltaic string and a comparison value between the two output voltages being greater than a first threshold: control a switching transistor in the first direct current conversion module to be turned on or off to decrease the output voltage of the first photovoltaic string and control a switching transistor in the second direct current conversion module to be turned on or off to increase the output voltage of the second photovoltaic string, so that a comparison value between the output voltage of the second photovoltaic string and a bus voltage of the direct current bus is less than a second threshold.

20 Claims, 5 Drawing Sheets

POWER CONVERSION APPARATUS AND CONTROL METHOD

CROSS-REFERENCE TO RELATED DISCLOSURES

This application claims priority to Chinese Patent Application No. 202310193507.2, filed on Feb. 23, 2023, which is hereby incorporated by reference in its entirety.

TECHNICAL FIELD

This application relates to the field of power electronics technologies, and in particular, to a power conversion apparatus and a control method.

BACKGROUND

Currently, to resolve a problem of a series-parallel mismatch of photovoltaic modules caused by a reason such as shading or the like, a converter (also referred to as an optimizer) is usually connected to each photovoltaic module, and an output of the converter may be connected to an inverter through a specific series-parallel combination. The converter can convert an output voltage/current of the photovoltaic module into a different output voltage/current to implement a maximum power point tracking (Maximum Power Point Tracking, MPPT) function at a photovoltaic module level. A combination of a photovoltaic module and a converter may be referred to as a smart module. In a scenario in which each photovoltaic module in a photovoltaic system is configured with a converter, a photovoltaic string may include a plurality of smart modules connected in series, and an upper limit of a quantity of assemblies included in a single photovoltaic string is increased. This can increase a system energy yield.

In a photovoltaic system configured with a converter, different photovoltaic strings may include different quantities of smart modules. These photovoltaic strings may be classified into a long string and a short string. An output end of the long string and an output end of the short string are connected in parallel to a direct current bus. When the inverter performs MPPT control on these photovoltaic strings, an output voltage of the long string is different from an output voltage of the short string, and a voltage difference between the output voltage of the short string and a voltage of the direct current bus is large. This causes low operating efficiency of the inverter, and affects the system energy yield.

SUMMARY

This application provides a power conversion apparatus and a control method, to improve operating efficiency of the power conversion apparatus and to increase a system energy yield.

According to a first aspect, this application provides a power conversion apparatus. The power conversion apparatus includes a first direct current conversion module, a second direct current conversion module, and a control module. An input end of the first direct current conversion module is configured to connect to a first photovoltaic string. An input end of the second direct current conversion module is configured to connect to a second photovoltaic string. An output end of the first direct current conversion module and an output end of the second direct current conversion module are connected in parallel to a direct current bus. The control module is configured to: control, when an output voltage of the first photovoltaic string is greater than an output voltage of the second photovoltaic string and a comparison value between the two output voltages is greater than a first threshold, a switching transistor in the first direct current conversion module to be turned on or off to decrease the output voltage of the first photovoltaic string and a switching transistor in the second direct current conversion module to be turned on or off to increase the output voltage of the second photovoltaic string, so that a comparison value between the output voltage of the second photovoltaic string and a bus voltage of the direct current bus is less than a second threshold. Herein, the comparison value between the output voltage of the first photovoltaic string and the output voltage of the second photovoltaic string may be a difference, a ratio, a change rate, or the like between a larger value and a smaller value of the two voltages. For example, when the output voltage of the first photovoltaic string and the output voltage of the second photovoltaic string are represented by U1 and U2, the comparison value between the two output voltages may be U1−U2, U1/U2, or (U1−U2)/U1. A specific calculation manner of the comparison value may be determined based on an actual requirement. The comparison value between the output voltage of the second photovoltaic string and the bus voltage may also be a difference, a ratio, a change rate, or the like between the bus voltage and the output voltage of the second photovoltaic string. The control module separately controls the switching transistor in the first direct current conversion module and the switching transistor in the second direct current conversion module to work, to adjust the output voltage of the first photovoltaic string and the output voltage of the second photovoltaic string. In other words, the control module separately performs MPPT on the two photovoltaic strings by using different MPPT policies. It may be understood that in the MPPT process, the control module still maximally controls the first photovoltaic string and the second photovoltaic string to output at respective maximum powers.

In this embodiment of this application, if the output voltage of the first photovoltaic string is greater than the output voltage of the second photovoltaic string and the comparison value between the two output voltages is greater than the first threshold, the control module in the power conversion apparatus may determine that a voltage difference between the second photovoltaic string and the direct current bus is large, and separately control the switching transistor in the first direct current conversion module and the switching transistor in the second direct current conversion module to work, to decrease the output voltage of the first photovoltaic string and to increase the output voltage of the second photovoltaic string until the comparison value between the second photovoltaic string and the bus voltage is less than the second threshold. In this process, the two photovoltaic strings are still maximally controlled to output at the respective maximum powers. This can improve operating efficiency of the power conversion apparatus and increase a system energy yield.

In a possible implementation, the control module is further configured to: if a quantity of smart modules included in the first photovoltaic string is greater than or equal to a quantity of smart modules included in the second photovoltaic string, obtain the output voltage of the first photovoltaic string and the output voltage of the second photovoltaic string, to obtain the comparison value between the output voltage of the first photovoltaic string and the output voltage of the second photovoltaic string. The smart module includes one photovoltaic module and one converter that are connected in series. Generally, a larger difference between the quantity of smart modules included in the first photovoltaic string and the quantity of smart modules included in the second photovoltaic string may indicate a larger difference between the output voltages of the two photovoltaic strings. In this case, a problem that a large voltage difference between the output voltage of the second photovoltaic string and the bus voltage causes low operating efficiency of the power conversion apparatus is likely to occur. Therefore, based on the quantities of smart modules included in the two photovoltaic strings, which photovoltaic string is the first photovoltaic string and which photovoltaic string is the second photovoltaic string are easily identified. Further, the output voltages of the two photovoltaic strings and the comparison value between the two output voltages may be obtained, to determine whether a problem that a voltage difference between the output voltage of the second photovoltaic string and the bus voltage is large exists in a system. This improves pertinence of a subsequent measure and improves the operating efficiency of the power conversion apparatus.

In a possible implementation, the control module is configured to: if the output voltage of the first photovoltaic string is greater than the output voltage of the second photovoltaic string, the comparison value between the two output voltages is greater than the first threshold, and MPPT efficiency of the second photovoltaic string is less than a third threshold, control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage of the direct current bus is less than the second threshold. Herein, the MPPT efficiency of the second photovoltaic string corresponds to the output voltage and an output current of the second photovoltaic string. Specifically, a correspondence between the MPPT efficiency of the photovoltaic string and the output voltage and the output current of the photovoltaic string may be prestored in a target table. After the output voltage and the output current of the photovoltaic string are obtained, the MPPT efficiency of the photovoltaic string may be obtained by querying the target table. In this embodiment of this application, if the output voltage of the first photovoltaic string is greater than the output voltage of the second photovoltaic string and the comparison value between the two output voltages is greater than the first threshold, a determining condition of detecting whether the MPPT efficiency of the second photovoltaic string meets a requirement is added, to help further determine whether a problem that the voltage difference between the output voltage of the second photovoltaic string and the bus voltage is excessively large exists in the system. This improves accuracy of the determining condition, and correspondingly helps improve the pertinence of the subsequent measure. Therefore, the operating efficiency of the power conversion apparatus can be effectively improved, and energy can be saved.

In a possible implementation, the control module is configured to: if the output voltage of the first photovoltaic string is greater than the output voltage of the second photovoltaic string, the comparison value between the two output voltages is greater than the first threshold, and a ripple current of the second photovoltaic string is greater than a fourth threshold, control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage of the direct current bus is less than the second threshold. The ripple current of the second photovoltaic string may be obtained through sampling. The fourth threshold may be set based on experience, and is not limited in this application. In this embodiment of this application, if the output voltage of the first photovoltaic string is greater than the output voltage of the second photovoltaic string and the comparison value between the two output voltages is greater than the first threshold, a determining condition of detecting whether the ripple current of the second photovoltaic string meets a requirement is added, to help further determine whether the problem that the voltage difference between the output voltage of the second photovoltaic string and the bus voltage is excessively large exists in the system. This improves the accuracy of the determining condition, and correspondingly helps improve the pertinence of the subsequent measure. Therefore, the operating efficiency of the power conversion apparatus can be effectively improved, and energy can be saved.

In a possible implementation, an output power voltage PV curve of the first photovoltaic string includes a first constant power interval, an output PV curve of the second photovoltaic string includes a second constant power interval, and a voltage corresponding to a right endpoint of the second constant power interval is less than or equal to a voltage corresponding to a left endpoint of the first constant power interval. The control module is configured to: control the switching transistor in the first direct current conversion module to be turned on or off to decrease the output voltage of the first photovoltaic string to a first voltage, and control the switching transistor in the second direct current conversion module to be turned on or off to increase the output voltage of the second photovoltaic string to a second voltage, where the first voltage is greater than or equal to the voltage corresponding to the left endpoint of the first constant power interval, and the second voltage is less than or equal to the voltage corresponding to the right endpoint of the second constant power interval. It may be understood that the quantity of smart modules included in the first photovoltaic string is greater than the quantity of smart modules included in the second photovoltaic string. In this embodiment of this application, when the foregoing voltage difference problem is resolved, the control module separately performs the MPPT on the first photovoltaic string and the second photovoltaic string by using the different MPPT policies, to decrease the output voltage of the first photovoltaic string to the first voltage and to increase the output voltage of the second photovoltaic string to the second voltage. This can ensure that the first photovoltaic string and the second photovoltaic string maximally maintain to output at the respective maximum powers. In this way, the voltage difference between the output voltage of the second photovoltaic string and the bus voltage is reduced. This can improve the operating efficiency of the power conversion apparatus and increase the system energy yield.

In a possible implementation, an output power voltage PV curve of the first photovoltaic string includes a first constant power interval, an output PV curve of the second photovoltaic string includes a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval. The control module is configured to: control the switching transistor in the first direct current conversion module to be turned on or off to decrease the output voltage of the first photovoltaic string to a first voltage, and control the switching transistor in the second direct current conversion module to be turned on or off to increase the output voltage of the second photovoltaic string to a second voltage, where the first voltage is greater than or equal to the voltage corresponding to the right endpoint of the second constant power interval, and the second voltage is less than or equal to the voltage corresponding to the right endpoint of the second constant power interval.

It may be understood that the quantity of smart modules included in the first photovoltaic string is greater than the quantity of smart modules included in the second photovoltaic string.

In this embodiment of this application, when the foregoing voltage difference problem is resolved, the control module separately performs the MPPT on the first photovoltaic string and the second photovoltaic string by using the different MPPT policies, to decrease the output voltage of the first photovoltaic string to the first voltage and to increase the output voltage of the second photovoltaic string to the second voltage. This can ensure that the first photovoltaic string and the second photovoltaic string maximally maintain to output at the respective maximum powers. In this way, the voltage difference between the output voltage of the second photovoltaic string and the bus voltage is reduced. This can improve the operating efficiency of the power conversion apparatus and increase the system energy yield.

In a possible implementation, the apparatus further includes an inverter module. An input end of the inverter module is connected to the direct current bus, and an output end of the inverter module is configured to connect to a load. The inverter module is configured to: receive direct currents that are output from the first photovoltaic string and the second photovoltaic string to the direct current bus, and invert the direct currents into an alternating current to supply power to the load.

According to a second aspect, this application provides a control method, where the method is applied to a control module in a power conversion apparatus. The power conversion apparatus further includes a first direct current conversion module and a second direct current conversion module. An input end of the first direct current conversion module is configured to connect to a first photovoltaic string, an input end of the second direct current conversion module is configured to connect to a second photovoltaic string, and an output end of the first direct current conversion module and an output end of the second direct current conversion module are connected in parallel to a direct current bus. The method includes: controlling, when an output voltage of the first photovoltaic string is greater than an output voltage of the second photovoltaic string and a comparison value between the two output voltages is greater than a first threshold, a switching transistor in the first direct current conversion module to be turned on or off to decrease the output voltage of the first photovoltaic string and a switching transistor in the second direct current conversion module to be turned on or off to increase the output voltage of the second photovoltaic string, so that a comparison value between the output voltage of the second photovoltaic string and a bus voltage of the direct current bus is less than a second threshold.

In a possible implementation, the method further includes: if a quantity of smart modules included in the first photovoltaic string is greater than or equal to a quantity of smart modules included in the second photovoltaic string, obtaining the output voltage of the first photovoltaic string and the output voltage of the second photovoltaic string, to obtain the comparison value between the output voltage of the first photovoltaic string and the output voltage of the second photovoltaic string, where the smart module includes one photovoltaic module and one converter that are connected in series.

In a possible implementation, the controlling, when an output voltage of the first photovoltaic string is greater than an output voltage of the second photovoltaic string and a comparison value between the two output voltages is greater than a first threshold, a switching transistor in the first direct current conversion module to be turned on or off to decrease the output voltage of the first photovoltaic string and a switching transistor in the second direct current conversion module to be turned on or off to increase the output voltage of the second photovoltaic string, so that a comparison value between the output voltage of the second photovoltaic string and a bus voltage of the direct current bus is less than a second threshold includes: if the output voltage of the first photovoltaic string is greater than the output voltage of the second photovoltaic string, the comparison value between the two output voltages is greater than the first threshold, and MPPT efficiency of the second photovoltaic string is less than a third threshold, controlling the switching transistor in the first direct current conversion module to be turned on or off to decrease the output voltage of the first photovoltaic string, and controlling the switching transistor in the second direct current conversion module to be turned on or off to increase the output voltage of the second photovoltaic string, so that the comparison value between the output voltage of the second photovoltaic string and the bus voltage of the direct current bus is less than the second threshold, and the MPPT efficiency of the second photovoltaic string corresponds to the output voltage and an output current of the second photovoltaic string.

In a possible implementation, the controlling, when an output voltage of the first photovoltaic string is greater than an output voltage of the second photovoltaic string and a comparison value between the two output voltages is greater than a first threshold, a switching transistor in the first direct current conversion module to be turned on or off to decrease the output voltage of the first photovoltaic string and a switching transistor in the second direct current conversion module to be turned on or off to increase the output voltage of the second photovoltaic string, so that a comparison value between the output voltage of the second photovoltaic string and a bus voltage of the direct current bus is less than a second threshold includes: if the output voltage of the first photovoltaic string is greater than the output voltage of the second photovoltaic string, the comparison value between the two output voltages is greater than the first threshold, and a ripple current of the second photovoltaic string is greater than a fourth threshold, controlling the switching transistor in the first direct current conversion module to be turned on or off to decrease the output voltage of the first photovoltaic string, and controlling the switching transistor in the second direct current conversion module to be turned on or off to increase the output voltage of the second photovoltaic string, so that the comparison value between the output voltage of the second photovoltaic string and the bus voltage of the direct current bus is less than the second threshold.

In a possible implementation, an output power voltage PV curve of the first photovoltaic string includes a first constant power interval, an output PV curve of the second photovoltaic string includes a second constant power interval, and a voltage corresponding to a right endpoint of the second constant power interval is less than or equal to a voltage corresponding to a left endpoint of the first constant power interval. The controlling the switching transistor in the first direct current conversion module to be turned on or off to decrease the output voltage of the first photovoltaic string, and controlling the switching transistor in the second direct current conversion module to be turned on or off to increase the output voltage of the second photovoltaic string includes: controlling the switching transistor in the first direct current conversion module to be turned on or off to decrease the output voltage of the first photovoltaic string to a first voltage, and controlling the switching transistor in the second direct current conversion module to be turned on or off to increase the output voltage of the second photovoltaic string to a second voltage, where the first voltage is greater than or equal to the voltage corresponding to the left endpoint of the first constant power interval, and the second voltage is less than or equal to the voltage corresponding to the right endpoint of the second constant power interval.

In a possible implementation, an output power voltage PV curve of the first photovoltaic string includes a first constant power interval, an output PV curve of the second photovoltaic string includes a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval. The controlling the switching transistor in the first direct current conversion module to be turned on or off to decrease the output voltage of the first photovoltaic string, and controlling the switching transistor in the second direct current conversion module to be turned on or off to increase the output voltage of the second photovoltaic string includes: controlling the switching transistor in the first direct current conversion module to be turned on or off to decrease the output voltage of the first photovoltaic string to a first voltage, and controlling the switching transistor in the second direct current conversion module to be turned on or off to increase the output voltage of the second photovoltaic string to a second voltage, where the first voltage is greater than or equal to the voltage corresponding to the right endpoint of the second constant power interval, and the second voltage is less than or equal to the voltage corresponding to the right endpoint of the second constant power interval.

In this embodiment of this application, when the output voltage of the first photovoltaic string is greater than the output voltage of the second photovoltaic string and the comparison value between the two output voltages is greater than the first threshold, the control module in the power conversion apparatus performs different MPPT on the first photovoltaic string and the second photovoltaic string, so that a voltage difference between the output voltage of the second photovoltaic string and the bus voltage is reduced. In a process in which the control module performs different MPPT control on the first photovoltaic string and the second photovoltaic string, the first photovoltaic string and the second photovoltaic string are still maximally enabled to output at respective maximum powers, so that the voltage difference between the output voltage of the second photovoltaic string and the bus voltage is further reduced. This can improve the operation efficiency of the power conversion apparatus and increase an energy yield of a photovoltaic system, and is helpful to improve power generation efficiency.

DESCRIPTION OF EMBODIMENTS

Solar energy is inexhaustible and non-polluting green energy that nature gives. In other words, solar energy is clean and renewable new energy that plays wide roles in lives and work of people. One of the roles is that solar energy is converted into electric energy. Solar power generation may be classified into photothermal power generation and photovoltaic power generation. A photovoltaic system provided in this application may be a power supply system based on solar photovoltaic power generation. The solar photovoltaic power generation features no moving component, no noise, no pollution, high reliability, and so on, and has an excellent application prospect in a communication power supply system in a remote area. The photovoltaic system provided in this application may be applicable to power supply to a plurality of types of electric devices such as a base station device, a battery, a household device (such as a refrigerator, an air conditioner, or the like), or the like. This may be specifically determined based on an actual application scenario, and is not limited herein. A power conversion apparatus provided in this application is applicable to the foregoing photovoltaic system. The power conversion apparatus may be a photovoltaic inverter or the like, and may be configured to: convert a variable direct current voltage generated by a direct current power supply such as a photovoltaic solar panel or the like into an alternating current of a mains frequency, and output the alternating current to a mains power grid for use by the mains power grid, specifically a base station device, a battery, a household device, or the like in the mains power grid. The photovoltaic system provided in this application may adapt to different application scenarios, for example, a solar power supply scenario, a solar hybrid power supply scenario, and the like. This may be specifically determined based on an actual application scenario, and is not limited herein. This application is described by using the solar power supply scenario as an example.

Figure 1:
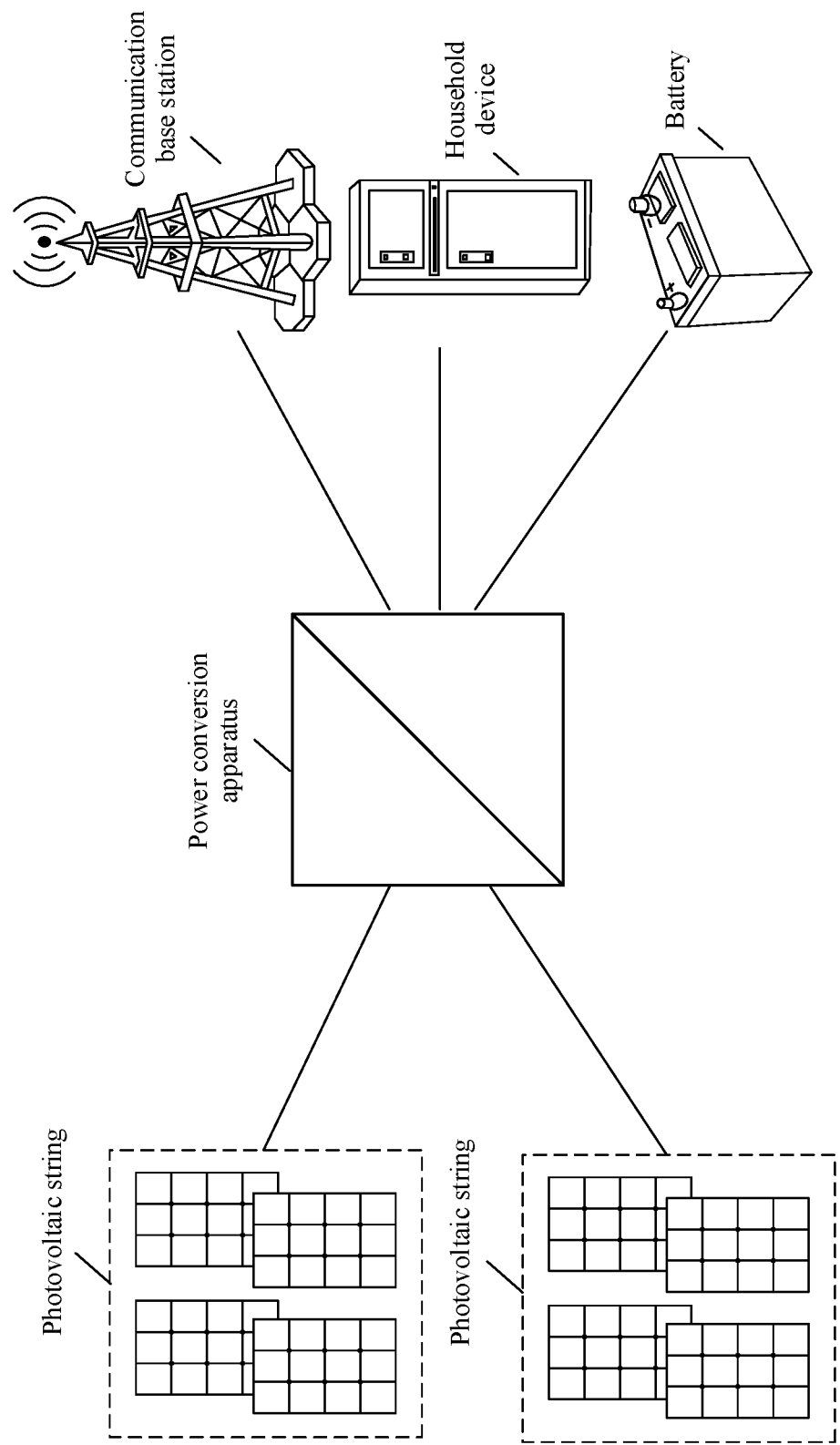
FIG. 1 is a schematic diagram of an application scenario of a photovoltaic system according to an embodiment of this application.
Figure 2:
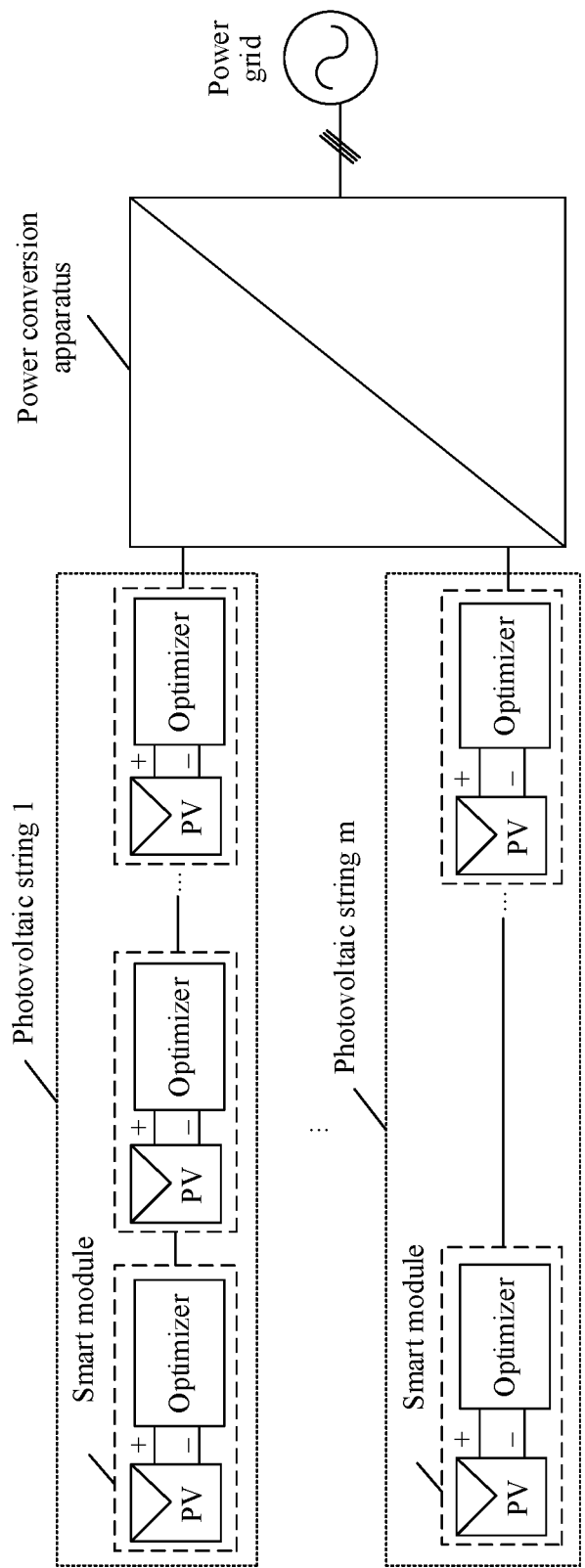
FIG. 2 is a schematic diagram of a structure of a photovoltaic system according to an embodiment of this application.

FIG. 1 is a schematic diagram of an application scenario of a photovoltaic system according to an embodiment of this application. The photovoltaic system provided in this application may include a power conversion apparatus and a plurality of photovoltaic strings used for photovoltaic power generation. Output ends of the plurality of photovoltaic strings are connected to an input end of the power conversion apparatus, and an output end of the power conversion apparatus may be connected to an alternating current power grid. In the photovoltaic system, the output ends of the plurality of photovoltaic strings may all be connected to the power conversion apparatus to supply a direct current input voltage to the power conversion apparatus. The power conversion apparatus may perform voltage power conversion on the direct current input voltage, to enable the voltage to be applicable to an electric device in the alternating current power grid, for example, a battery, a communication base station, a household device, or the like. FIG. 2 is a schematic diagram of a structure of a photovoltaic system according to an embodiment of this application. The photovoltaic system may be used in the application scenario shown in FIG. 1. The photovoltaic system includes a plurality of photovoltaic strings. One photovoltaic string in the plurality of photovoltaic strings may include a plurality of smart modules connected in series, and each smart module is obtained by connecting one photovoltaic (Photovoltaic, PV) module and one converter in series. As shown in FIG. 2, the plurality of photovoltaic strings may be a photovoltaic string 1, . . . , and a photovoltaic string m, where m≥2. Herein, the converter may also be referred to as an optimizer, a photovoltaic optimizer, a power optimizer, or the like. The converter in the smart module may be configured to: perform maximum power point tracking MPPT on the photovoltaic module in the smart module, and adjust an output current of the photovoltaic module to a target current based on a circuit requirement, to compensate for an energy yield loss caused by a mismatch problem in a photovoltaic string in which the smart module is located. Herein, the photovoltaic module may be a solar panel or a photovoltaic panel. In other words, in the photovoltaic system shown in FIG. 1 or FIG. 2, each photovoltaic string includes a plurality of smart modules, and each smart module includes the photovoltaic module and the converter. In other words, each photovoltaic module included in each photovoltaic string is configured with the converter. In the photovoltaic system, different photovoltaic strings may include different quantities of smart modules. These photovoltaic strings may be classified into a long string and a short string. An output end of the long string and an output end of the short string are both connected to a power conversion apparatus and are connected in parallel to a direct current bus. The power conversion apparatus in the photovoltaic system may separately perform the MPPT on the long string and the short string in the photovoltaic strings. In this case, for the long string and the short string, an output voltage of the long string and an output voltage of the short string may be different. Consequently, a voltage difference between the output voltage of the short string and a voltage of the direct current bus is large. This causes low operating efficiency of the power conversion apparatus, and affects a system energy yield.

If an output voltage of a first photovoltaic string is greater than an output voltage of a second photovoltaic string and a comparison value between the two output voltages is greater than a first threshold, a control module in the power conversion apparatus provided in this application may determine that a voltage difference between the second photovoltaic string and the direct current bus is large, and separately control a switching transistor in the first direct current conversion module and a switching transistor in the second direct current conversion module to work, to decrease the output voltage of the first photovoltaic string and to increase the output voltage of the second photovoltaic string until a comparison value between the second photovoltaic string and the bus voltage is less than a second threshold. In this process, the two photovoltaic strings are still maximally controlled to output at respective maximum powers. This can improve operating efficiency of the power conversion apparatus and increase the system energy yield. The following describes, with reference to FIG. 3 to FIG. 6, the power conversion apparatus provided in this application by using an example.

Figure 3:
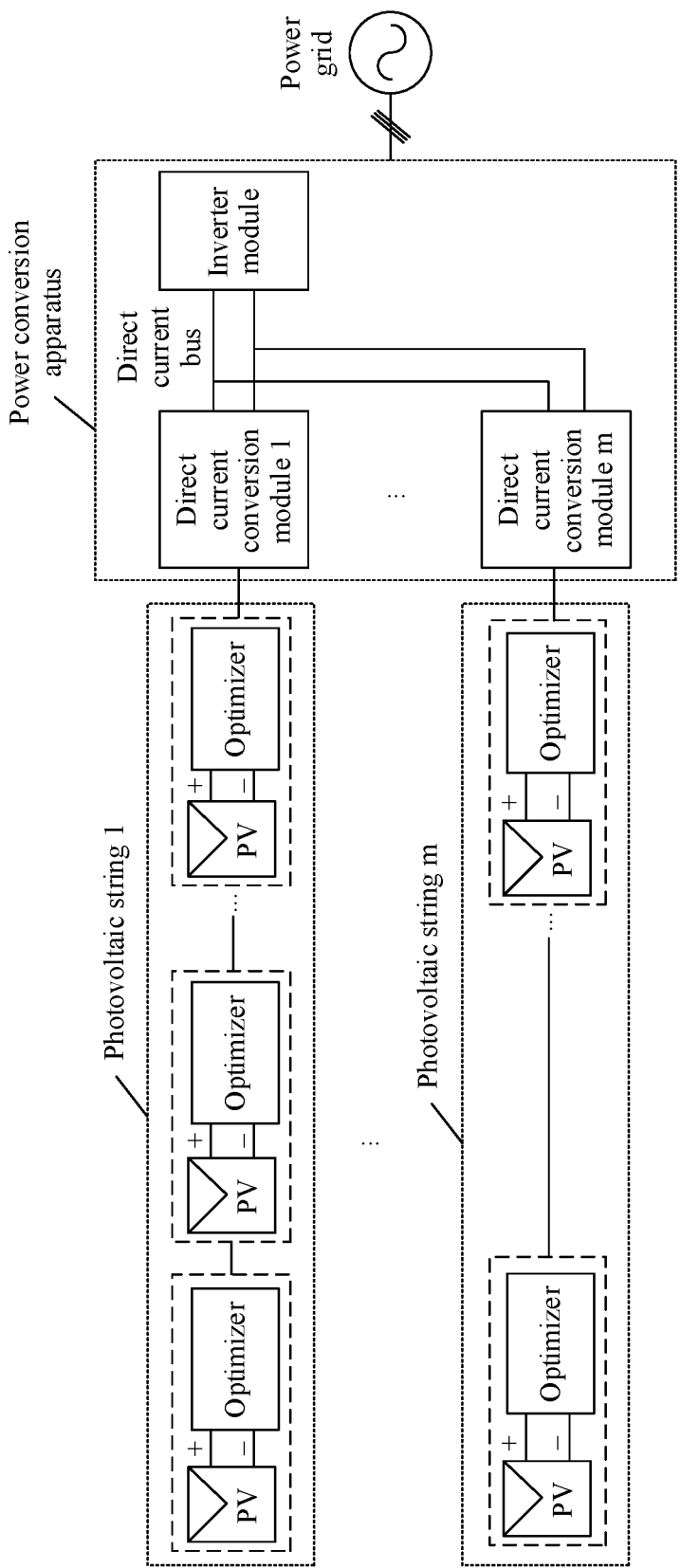
FIG. 3 is a schematic diagram of a structure of a power conversion apparatus according to an embodiment of this application.
Figure 4:
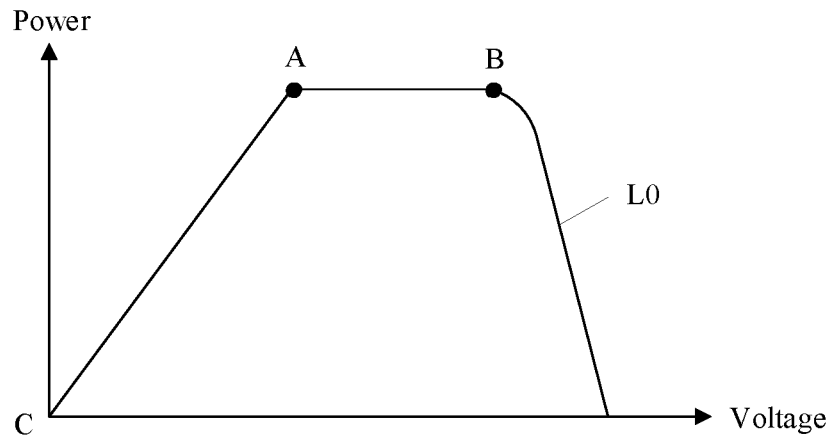
FIG. 4 is a schematic diagram of an output power voltage PV curve of a photovoltaic string according to an embodiment of this application.

FIG. 3 is a schematic diagram of a structure of a power conversion apparatus according to an embodiment of this application. The power conversion apparatus may be used in the photovoltaic system shown in FIG. 2. As shown in FIG. 3, the power conversion apparatus may include a first direct current conversion module, a second direct current conversion module, and a control module. An input end of the first direct current conversion module is configured to connect to a first photovoltaic string, an input end of the second direct current conversion module is configured to connect to a second photovoltaic string, and an output end of the first direct current conversion module and an output end of the second direct current conversion module are connected in parallel to a direct current bus. Herein, both the first photovoltaic string and the second photovoltaic string include a plurality of smart modules connected in series, and one smart module includes one photovoltaic module and one converter that are connected in series. The first photovoltaic string and the second photovoltaic string may include different quantities of smart modules. As shown in FIG. 3, when the photovoltaic string 1 and the photovoltaic string m are respectively the first photovoltaic string and the second photovoltaic string, a direct current conversion module 1 is the first direct current conversion module, and a direct current conversion module m is the second direct current conversion module. Herein, both the first direct current conversion module and the second direct current conversion module include a plurality of switching transistors, and the control module may control the switching transistor in the first direct current conversion module (or the second direct current conversion module) to be turned on or off, to correspondingly adjust an output voltage of the first photovoltaic string (or the second photovoltaic string). Herein, the switching transistors in the first direct current conversion module and the second direct current conversion module may be an insulated gate bipolar transistor (Insulated Gate Bipolar Transistor, IGBT), a metallic oxide semiconductor field effect transistor (Metallic Oxide Semiconductor Field Effect Transistor, MOSFET), or the like, and may be specifically determined based on an actual application scenario. The first photovoltaic string and the second photovoltaic string may output direct current voltages to the power conversion apparatus, and the output voltages of the photovoltaic strings are an input voltage received by the power conversion apparatus from the photovoltaic strings.

The power conversion apparatus shown in FIG. 3 may further include an inverter module, an input end of the inverter module is connected to the direct current bus, and an output end of the inverter module may be configured to connect to a load. The load may be a load in an alternating current power grid, for example, a communication base station, a household device, a battery, or the like. The inverter module may receive direct currents that are output from the first photovoltaic string and the second photovoltaic string to the direct current bus, and invert the direct currents into an alternating current to supply power to the load. In this case, the power conversion apparatus may include an inverter and the like.

In the power conversion apparatus shown in FIG. 3, the control module may be configured to: control, when the output voltage of the first photovoltaic string is greater than the output voltage of the second photovoltaic string and a comparison value between the two output voltages is greater than a first threshold, the switching transistor in the first direct current conversion module to be turned on or off to decrease the output voltage of the first photovoltaic string and the switching transistor in the second direct current conversion module to be turned on or off to increase the output voltage of the second photovoltaic string, so that a comparison value between the output voltage of the second photovoltaic string and a bus voltage of the direct current bus is less than a second threshold. Herein, the comparison value between the output voltage of the first photovoltaic string and the output voltage of the second photovoltaic string may be a difference, a ratio, a change rate, or the like between a larger value and a smaller value of the two voltages. For example, when the output voltage of the first photovoltaic string and the output voltage of the second photovoltaic string are represented by U1 and U2, the comparison value between the two output voltages may be U1−U2, U1/U2, or (U1−U2)/U1. A specific calculation manner of the comparison value may be determined based on an actual requirement, and is not limited in this application. The comparison value between the output voltage of the second photovoltaic string and the bus voltage may also be a difference, a ratio, a change rate, or the like between the bus voltage and the output voltage of the second photovoltaic string. It may be understood that a calculation manner of the comparison value between the output voltage of the first photovoltaic string and the output voltage of the second photovoltaic string and a calculation manner of the comparison value between the output voltage of the second photovoltaic string and the bus voltage may be the same or may be different, and may be specifically determined based on an actual requirement. The first threshold may be determined based on experience or test data, and is not limited herein. A specific value of the second threshold may be determined based on an actual application scenario.

It may be understood that an output end of the first photovoltaic string and an output end of the second photovoltaic string are connected in parallel to the direct current bus. Therefore, the bus voltage of the direct current bus is associated with the output voltage of the first photovoltaic string and the output voltage of the second photovoltaic string. When the output voltage of the first photovoltaic string is greater than the output voltage of the second photovoltaic string and the comparison value between the two output voltages is greater than the first threshold, a voltage difference between the output voltages of the two photovoltaic strings is large and exceeds a specific range. Consequently, a voltage difference between the output voltage of the second photovoltaic string and the bus voltage of the direct current bus may be large. This affects operating efficiency of the power conversion apparatus, and further affects a system energy yield. In this case, the control module in this embodiment of this application controls the switching transistor in the first direct current conversion module to be turned on or off to decrease the output voltage of the first photovoltaic string, and controls the switching transistor in the second direct current conversion module to be turned on or off to increase the output voltage of the second photovoltaic string, so that the comparison value between the output voltage of the first photovoltaic string and the output voltage of the second photovoltaic string may be decreased, that is, the voltage difference between the two output voltages may be reduced. In this case, the comparison value between the bus voltage of the direct current bus and the output voltage of the second photovoltaic string also decreases accordingly. When the comparison value between the bus voltage of the direct current bus and the output voltage of the second photovoltaic string is less than the second threshold, the voltage difference between the bus voltage of the direct current bus and the output voltage of the second photovoltaic string is decreased to meet a requirement. In other words, the control module separately performs MPPT on the first photovoltaic string and the second photovoltaic string by using different MPPT policies, so that the voltage difference between the bus voltage and the output voltage of the second photovoltaic string is decreased to meet the requirement. When adjusting the output voltage of the first photovoltaic string to decrease and the output voltage of the second photovoltaic string to increase to decrease the voltage difference between the bus voltage and the output voltage of the second photovoltaic string, the control module in the power conversion apparatus still maximally enables the first photovoltaic string and the second photovoltaic string to output at respective maximum powers. Therefore, the operating efficiency of the power conversion apparatus is improved, and this can increase the system energy yield.

In some feasible implementations, the control module in the power conversion apparatus may be further configured to: if the quantity of smart modules included in the first photovoltaic string is greater than or equal to the quantity of smart modules included in the second photovoltaic string, obtain the output voltage of the first photovoltaic string and the output voltage of the second photovoltaic string, to obtain the comparison value between the output voltage of the first photovoltaic string and the output voltage of the second photovoltaic string. The smart module includes one photovoltaic module and one converter that are connected in series. Generally, a larger difference between the quantity of smart modules included in the first photovoltaic string and the quantity of smart modules included in the second photovoltaic string may indicate a larger difference between the output voltages of the two photovoltaic strings. In this case, a problem that a large voltage difference between the output voltage of the second photovoltaic string and the bus voltage causes low operating efficiency of the power conversion apparatus is likely to occur. It may be understood that the control module may identify, based on the quantities of smart modules respectively included in the first photovoltaic string and the second photovoltaic string, which one is a "long string" and which one is a "short string". A photovoltaic string including more smart modules is used as the first photovoltaic string, and the other photovoltaic string is used as the second photovoltaic string, to obtain the output voltages of the two photovoltaic strings and the comparison value between the two output voltages. When the quantity of smart modules included in the first photovoltaic string is equal to the quantity of smart modules included in the second photovoltaic string, because the two photovoltaic strings may be shielded differently, the output voltages of the two photovoltaic strings may also be different. In this case, the output voltages of the two photovoltaic strings may be obtained. A photovoltaic string with a larger output voltage is used as the first photovoltaic string, and the other photovoltaic string is used as the second photovoltaic string, to obtain the comparison value between the output voltages of the two photovoltaic strings. In other words, the control module may obtain the comparison value between the output voltage of the first photovoltaic string and the output voltage of the second photovoltaic string based on the quantities of smart modules respectively included in the two photovoltaic strings and an output voltage status, and subsequently may separately use a corresponding MPPT policy for the first photovoltaic string and the second photovoltaic string, to improve the operating efficiency of the power conversion apparatus.

To more specifically resolve a problem that a voltage difference between output voltages of some photovoltaic strings and the bus voltage is large, a condition of determining whether a voltage difference between output voltages of different photovoltaic strings is large enough may be more strictly limited. For example, in some feasible implementations, if the output voltage of the first photovoltaic string is greater than the output voltage of the second photovoltaic string, the comparison value between the two output voltages is greater than the first threshold, and MPPT efficiency of the second photovoltaic string is less than a third threshold, the control module in the power conversion apparatus may determine that the voltage difference between the output voltages of the first photovoltaic string and the second photovoltaic string is large enough. In this case, the control module separately uses the different MPPT policies for the first photovoltaic string and the second photovoltaic string, to resolve a problem that a voltage difference between the output voltage of the second photovoltaic string and the bus voltage is large. In other words, if the output voltage of the first photovoltaic string is greater than the output voltage of the second photovoltaic string, the comparison value between the two output voltages is greater than the first threshold, and the MPPT efficiency of the second photovoltaic string is less than the third threshold, the control module may control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage of the direct current bus is less than the second threshold. The MPPT efficiency of the second photovoltaic string corresponds to the output voltage and an output current of the second photovoltaic string. In other words, the MPPT efficiency of the second photovoltaic string is associated with the output voltage and the output current of the second photovoltaic string. Specifically, a correspondence between the MPPT efficiency of the photovoltaic string and the output voltage and the output current of the photovoltaic string may be prestored in a target table. After the output voltage and the output current of the photovoltaic string are obtained, the MPPT efficiency of the photovoltaic string may be obtained by querying the target table. The third threshold may be set based on experience, and is not limited in this application. In this embodiment of this application, if the output voltage of the first photovoltaic string is greater than the output voltage of the second photovoltaic string and the comparison value between the two output voltages is greater than the first threshold, a limiting condition may be further added. If the MPPT efficiency of the second photovoltaic string is also less than the third threshold, it is determined that the voltage difference between the second photovoltaic string and the bus voltage is large to a specific extent, and this affects power generation efficiency of the system. In this case, the switching transistor in the first direct current conversion module and the switching transistor in the second direct current conversion module are separately controlled to work, to decrease the output voltage of the first photovoltaic string and to increase the output voltage of the second photovoltaic string until the comparison value between the output voltage of the second photovoltaic string and the bus voltage is less than the second threshold, so that the voltage difference between the output voltage of the second photovoltaic string and the bus voltage may be reduced. This can more effectively improve the operating efficiency of the power conversion apparatus and increase the system energy yield.

Optionally, in some feasible implementations, if the output voltage of the first photovoltaic string is greater than the output voltage of the second photovoltaic string, the comparison value between the two output voltages is greater than the first threshold, and a ripple current of the second photovoltaic string is greater than a fourth threshold, the control module in the power conversion apparatus may control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage of the direct current bus is less than the second threshold. It may be understood that when the voltage difference between the output voltage of the first photovoltaic string and the output voltage of the second photovoltaic string is large, the voltage difference between the output voltage of the second photovoltaic string and the bus voltage is also large, and the ripple current of the second photovoltaic string also increases. Therefore, whether the ripple current of the second photovoltaic string is large (greater than the fourth threshold) is detected, so that it can be further proved whether a problem that the voltage difference between the output voltages of the different photovoltaic strings is large exists in the system. Therefore, adding the limitation condition helps further determine whether the problem that the voltage difference between the output voltage of the second photovoltaic string and the bus voltage is excessively large exists in the system. This improves accuracy of the determining condition, and correspondingly helps improve pertinence of a subsequent measure. Therefore, the operating efficiency of the power conversion apparatus can be effectively improved, and energy can be saved. The ripple current of the second photovoltaic string may be obtained through sampling. The fourth threshold may be set based on experience, and is not limited in this application. In this embodiment of this application, if the output voltage of the first photovoltaic string is greater than the output voltage of the second photovoltaic string and the comparison value between the two output voltages is greater than the first threshold, a limiting condition may be further added. If the ripple current of the second photovoltaic string is greater than the fourth threshold, it is determined that the voltage difference between the second photovoltaic string and the bus voltage is large to a specific extent, and this affects the power generation efficiency of the system. In this case, the switching transistor in the first direct current conversion module and the switching transistor in the second direct current conversion module are controlled to work, to decrease the output voltage of the first photovoltaic string and to increase the output voltage of the second photovoltaic string until the comparison value between the output voltage of the second photovoltaic string and the bus voltage is less than the second threshold, so that the voltage difference between the output voltage of the second photovoltaic string and the bus voltage may be reduced. This can greatly improve the operating efficiency of the power conversion apparatus and increase the system energy yield.

Optionally, in addition to determining the MPPT efficiency of the second photovoltaic string or whether the ripple current of the second photovoltaic string exceeds the threshold, in this application, an electromagnetic compatibility (Electromagnetic Compatibility, EMC) parameter or the like of the power conversion apparatus may also be used as a determining condition to determine whether the voltage difference between the output voltage of the second photovoltaic string and the bus voltage is large enough to affect the operating efficiency of the power conversion apparatus. In other words, in this application, another determining condition may also be used to determine whether the voltage difference between the output voltage of the first photovoltaic string and the output voltage of the second photovoltaic string or the voltage difference between the output voltage of the second photovoltaic string and the bus voltage is large to a specific extent, provided that the determining condition can reflect a difference status between the output voltage of the first photovoltaic string and the output voltage of the second photovoltaic string or reflect a difference status between the output voltage of the second photovoltaic string and the bus voltage. This is not limited in this application. It may be understood that any one of the foregoing mentioned determining conditions and another determining condition may be used as an independent determining condition, to determine whether the voltage difference between the output voltage of the second photovoltaic string and the bus voltage is large enough to affect the operating efficiency of the power conversion apparatus. A plurality of conditions in these determining conditions may also be combined as a determining condition, to determine whether the voltage difference between the output voltage of the second photovoltaic string and the bus voltage is large enough to affect the operating efficiency of the power conversion apparatus. This is not limited in this application.

As shown in FIG. 2 or FIG. 3, each photovoltaic string in the photovoltaic system may include the plurality of smart modules, and each smart module includes the photovoltaic string and the converter that are connected in series. Under an action of the converter, an output power voltage PV curve of the entire photovoltaic string may be shown as a curve L0 in FIG. 4. It can be learned from FIG. 4 that the output PV curve may include a constant power interval AB, and the output PV curve may further include a voltage limiting interval CA. A first endpoint (that is, a point A in FIG. 4) that is of the voltage limiting interval in the output PV curve of the photovoltaic string and that is close to the constant power interval is also a left endpoint of the constant power interval. When the output voltage of the photovoltaic string is a voltage corresponding to any point (excluding the first endpoint) in the voltage limiting interval of the output PV curve, an output power of the photovoltaic string is less than a maximum power. When the output voltage of the photovoltaic string is a voltage corresponding to any point in the constant power interval AB, the output power of the photovoltaic string is equal to the maximum power. In this case, the photovoltaic string outputs a constant power. It may be understood that in engineering application, when an operating point of the photovoltaic string is any point in the constant power interval, the output power of the photovoltaic string may be slightly different based on different output voltages. However, in general, a difference between different powers is less than a specific threshold and the powers are approximately equal. Therefore, it may still be considered that all points in the constant power interval correspond to a same output power. Generally, if the photovoltaic string includes n smart modules, the output PV curve of the photovoltaic string may be considered as superposition of output PV curves of the n smart modules. Therefore, an output PV curve of the first photovoltaic string and an output PV curve of the second photovoltaic string are similar, and are both similar to the output PV curve shown in FIG. 4, but there is a difference between the output PV curve of the first photovoltaic string and the output PV curve of the second photovoltaic string. In this embodiment of this application, when it is determined that the voltage difference between the output voltage of the first photovoltaic string and the output voltage of the second photovoltaic string is large enough, and the power conversion apparatus separately performs the MPPT on the two photovoltaic strings, the first photovoltaic string and the second photovoltaic string are still maximally controlled to output at respective maximum powers. In other words, the first photovoltaic string and the second photovoltaic string still work at output voltages corresponding to points in constant power intervals of the respective output PV curves. In this way, it can be consistently ensured that output powers of the photovoltaic strings do not change greatly, and no loss of the system energy yield is ensured. Because the output PV curve of the first photovoltaic string and the output PV curve of the second photovoltaic string are different, when the output voltage of the first photovoltaic string is greater than the output voltage of the second photovoltaic string and the comparison value between the two output voltages is greater than the first threshold, cases in which the control module in the power conversion apparatus controls the switching transistors to adjust the output voltages of the two photovoltaic strings to specific voltages are also different. The following separately describes these cases.

Figure 5:
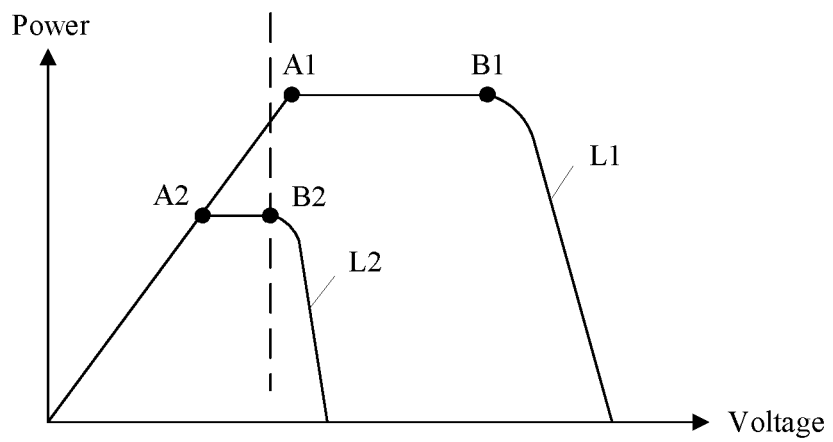
FIG. 5 is a schematic diagram of comparison between an output PV curve of a first photovoltaic string and an output PV curve of a second photovoltaic string according to an embodiment of this application.

In some feasible implementations, the output power voltage PV curve of the first photovoltaic string includes a first constant power interval, the output PV curve of the second photovoltaic string includes a second constant power interval, and a voltage corresponding to a right endpoint of the second constant power interval is less than or equal to a voltage corresponding to a left endpoint of the first constant power interval. It may be understood that the quantity of smart modules included in the first photovoltaic string is greater than the quantity of smart modules included in the second photovoltaic string. In this case, the control module in the power conversion apparatus may control the switching transistor in the first direct current conversion module to be turned on or off to decrease the output voltage of the first photovoltaic string to a first voltage, and control the switching transistor in the second direct current conversion module to be turned on or off to increase the output voltage of the second photovoltaic string to a second voltage. Herein, the first voltage is greater than or equal to the voltage corresponding to the left endpoint of the first constant power interval, and the second voltage is less than or equal to the voltage corresponding to the right endpoint of the second constant power interval. As shown in FIG. 5, FIG. 5 is a schematic diagram of comparison between the output PV curve of the first photovoltaic string and the output PV curve of the second photovoltaic string. In FIG. 5, the output PV curve of the first photovoltaic string and the output PV curve of the second photovoltaic string are respectively shown as a curve L1 and a curve L2. A left endpoint of a constant power interval A1B1 (that is, the first constant power interval) included in the first photovoltaic string is A1. A right endpoint of a constant power interval A2B2 (that is, the second constant power interval) included in the output PV curve of the second photovoltaic string is B2. As shown in FIG. 5, the voltage corresponding to the point B2 is less than or equal to the voltage corresponding to the point A1. In this case, to ensure that the output power of the first photovoltaic string and the output power of the second photovoltaic string are consistently the respective maximum powers, after being controlled by the control module in the power conversion apparatus, the output voltage of the first photovoltaic string is maximally decreased to the voltage corresponding to the point A1, that is, the output voltage of the first photovoltaic string is decreased to the first voltage. The output voltage of the second photovoltaic string is maximally increased to the voltage corresponding to the point B2, that is, the output voltage of the second photovoltaic string is increased to the second voltage. In this embodiment of this application, when the voltage difference between the output voltage of the first photovoltaic string and the output voltage of the second photovoltaic string is large to a specific extent, based on a relationship between the output PV curve of the first photovoltaic string and the output PV curve of the second photovoltaic string, the control module in the power conversion apparatus separately performs the MPPT on the first photovoltaic string and the second photovoltaic string by using the different MPPT policies, to finally decrease the output voltage of the first photovoltaic string to the first voltage and to increase the output voltage of the second photovoltaic string to the second voltage. In this way, the voltage difference between the second photovoltaic string and the bus voltage is reduced, and it is maximally ensured that the output power of the first photovoltaic string and the output power of the second photovoltaic string are maximum. This improves the operating efficiency of the power conversion apparatus and increases the system energy yield.

Figure 6:
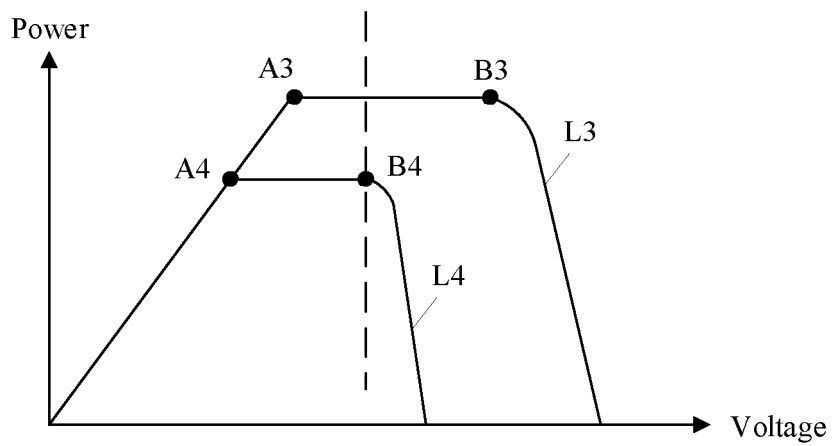
FIG. 6 is another schematic diagram of comparison between an output PV curve of a first photovoltaic string and an output PV curve of a second photovoltaic string according to an embodiment of this application.

In some feasible implementations, the output power voltage PV curve of the first photovoltaic string includes a first constant power interval, the output PV curve of the second photovoltaic string includes a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval. It may be understood that the quantity of smart modules included in the first photovoltaic string is greater than or equal to the quantity of smart modules included in the second photovoltaic string. In this case, the control module in the power conversion apparatus may control the switching transistor in the first direct current conversion module to be turned on or off to decrease the output voltage of the first photovoltaic string to a first voltage, and control the switching transistor in the second direct current conversion module to be turned on or off to increase the output voltage of the second photovoltaic string to a second voltage. Herein, the first voltage is greater than or equal to the voltage corresponding to the right endpoint of the second constant power interval, and the second voltage is less than or equal to the voltage corresponding to the right endpoint of the second constant power interval. As shown in FIG. 6, FIG. 6 is another schematic diagram of comparison between the output PV curve of the first photovoltaic string and the output PV curve of the second photovoltaic string. In FIG. 6, a left endpoint of a constant power interval A3B3 (that is, the first constant power interval) included in the output PV curve of the first photovoltaic string is A3, and a left endpoint and a right endpoint of a constant power interval A4B4 (that is, the second constant power interval) included in the output PV curve of the second photovoltaic string are respectively A4 and B4. It can be learned from FIG. 6 that the voltage corresponding to the point B4 is greater than or equal to the voltage corresponding to the point A3, and is less than or equal to a voltage corresponding to a point B3. In this case, to ensure that the output power of the first photovoltaic string and the output power of the second photovoltaic string are consistently the respective maximum powers, after being controlled by the control module in the power conversion apparatus, the output voltage of the first photovoltaic string is maximally decreased to the voltage corresponding to the point B4, that is, the output voltage of the first photovoltaic string is decreased to the first voltage. The output voltage of the second photovoltaic string is maximally increased to the voltage corresponding to the point B4, that is, the output voltage of the second photovoltaic string is increased to the second voltage. In a possible case, the output voltage of the first photovoltaic string may finally be basically equal to the bus voltage, and the comparison value between the output voltage of the second photovoltaic string and the bus voltage is less than the second threshold. In this embodiment of this application, based on the relationship between the output PV curve of the first photovoltaic string and the output PV curve of the second photovoltaic string, the control module in the power conversion apparatus separately performs MPPT control on the first photovoltaic string and the second photovoltaic string by using the different MPPT policies, to finally decrease the output voltage of the first photovoltaic string to the first voltage (between the voltage corresponding to the point B4 and the voltage corresponding to the point B3) and to increase the output voltage of the second photovoltaic string to the second voltage (between a voltage corresponding to the point A4 and the voltage corresponding to the point B4). In this way, the voltage difference between the second photovoltaic string and the bus voltage is reduced, and it can be maximally ensured that the output power of the first photovoltaic string and the output power of the second photovoltaic string are maximum. This can improve the operating efficiency of the power conversion apparatus and increase the system energy yield.

In this application, when the output voltage of the first photovoltaic string is greater than the output voltage of the second photovoltaic string and the comparison value between the two output voltages is greater than the first threshold, the control module in the power conversion apparatus determines that the voltage difference between the output voltages of the two photovoltaic strings is large. Correspondingly, the voltage difference between the output voltage of the second photovoltaic string and the bus voltage may also be large. In this case, the control module may control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage is less than the second threshold. In other words, the control module separately performs the MPPT on the first photovoltaic string and the second photovoltaic string by using the different MPPT policies, so that the voltage difference between the output voltage of the second photovoltaic string and the bus voltage is reduced and it is maximally ensured that both the first photovoltaic string and the second photovoltaic string output at the respective maximum powers. In this way, the voltage difference between the output voltage of the second photovoltaic string and the bus voltage may be reduced. This can improve the operation efficiency of the power conversion apparatus and increase the energy yield of the photovoltaic system, and is helpful to improve power generation efficiency.

Figure 7:
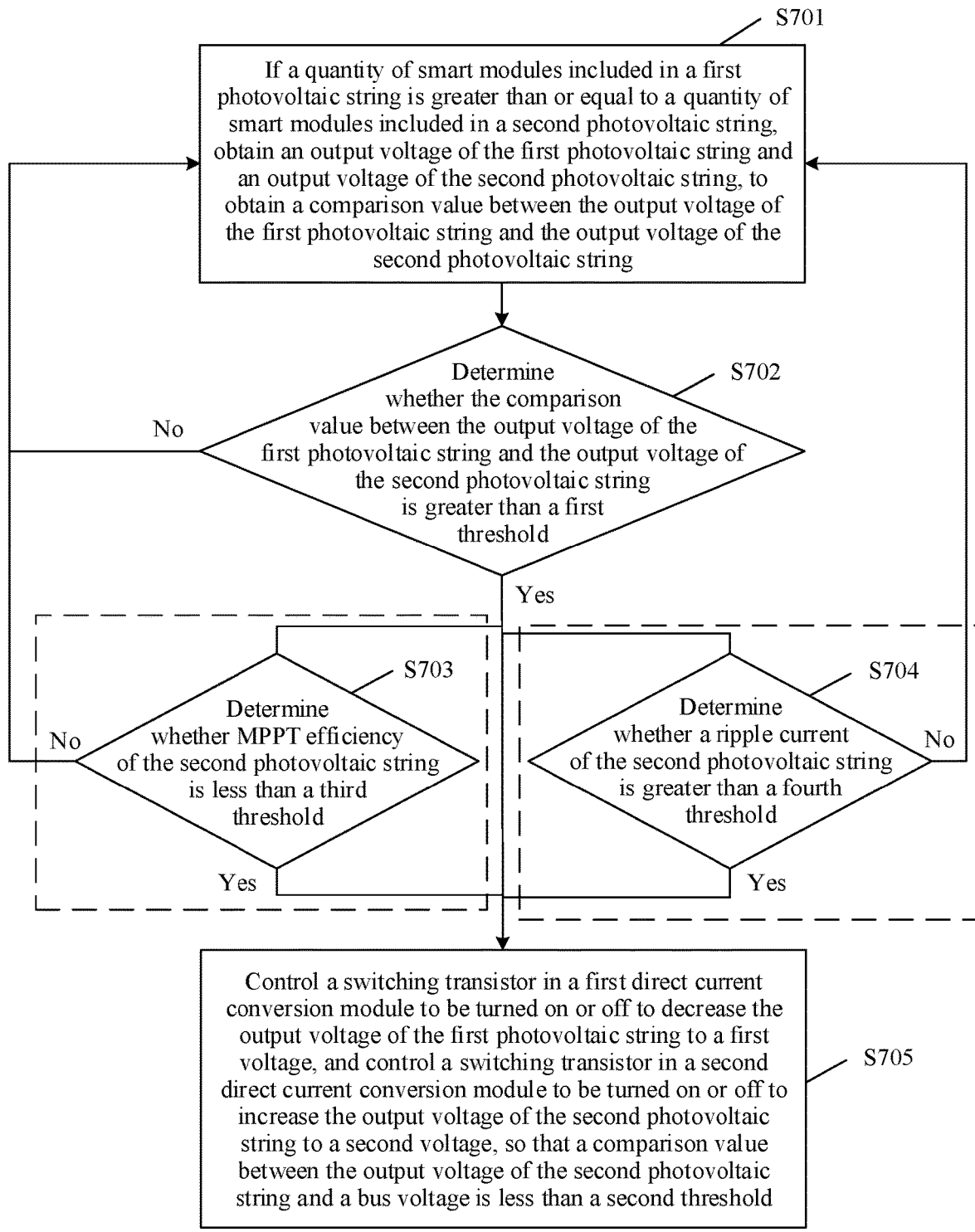
FIG. 7 is a schematic flowchart of a control method according to an embodiment of this application.

FIG. 7 is a schematic flowchart of a control method according to this application. The control method provided in this application is applicable to a control module in a power conversion apparatus. The power conversion apparatus may be used in the photovoltaic system shown in FIG. 1 or FIG. 2. A structure of the power conversion apparatus may be shown in FIG. 3. The power conversion apparatus further includes a first direct current conversion module and a second direct current conversion module, an input end of the first direct current conversion module is configured to connect to a first photovoltaic string, an input end of the second direct current conversion module is configured to connect to a second photovoltaic string, and an output end of the first direct current conversion module and an output end of the second direct current conversion module are connected in parallel to a direct current bus. The method may include the following steps.

Step S701: If a quantity of smart modules included in the first photovoltaic string is greater than or equal to a quantity of smart modules included in the second photovoltaic string, obtain an output voltage of the first photovoltaic string and an output voltage of the second photovoltaic string, to obtain a comparison value between the output voltage of the first photovoltaic string and the output voltage of the second photovoltaic string.

In some feasible implementations, the control module in the power conversion apparatus may obtain the quantities of smart modules respectively included in the two photovoltaic strings, use a photovoltaic string that includes more smart modules and that is in the two photovoltaic strings as the first photovoltaic string, and use the other photovoltaic string as the second photovoltaic string. The control module may further obtain the output voltage of the first photovoltaic string and the output voltage of the second photovoltaic string, to obtain the comparison value between the two output voltages. In some feasible implementations, the control module in the power conversion apparatus may obtain the quantities of smart modules respectively included in the two photovoltaic strings, and if the quantities of smart modules included in the two photovoltaic strings are equal, obtain the respective output voltages of the two photovoltaic strings and the comparison value between the two output voltages. A photovoltaic string with a larger output voltage may be used as the first photovoltaic string, and the other photovoltaic string may be used as the second photovoltaic string. The comparison value between the output voltages of the two photovoltaic strings may be a difference, a ratio, or a change rate between the two output voltages, and may be specifically determined based on an application scenario.

Step S702: Determine whether the comparison value between the output voltage of the first photovoltaic string and the output voltage of the second photovoltaic string is greater than a first threshold. If the comparison value between the output voltage of the first photovoltaic string and the output voltage of the second photovoltaic string is not greater than the first threshold, return to step S701.

In some feasible implementations, an inverter may perform step S701 and step S702. When performing step S702, a determining result is yes, and step S705 is directly performed subsequently.

Optionally, in some feasible implementations, the inverter may perform step S701 to step S702. When performing step S702, if a determining result is yes, the inverter continues to perform step S703.

Optionally, in some feasible implementations, the inverter may perform step S701 and step S702. When performing step S702, if a determining result is yes, the inverter continues to perform step S704.

Step S703: Determine whether MPPT efficiency of the second photovoltaic string is less than a third threshold. If the MPPT efficiency of the second photovoltaic string is not less than the third threshold, return to step S701; or if the MPPT efficiency of the second photovoltaic string is less than the third threshold, continue to perform step S705.

In a feasible implementation, a correspondence between MPPT of a photovoltaic string and an output voltage and an output current of the photovoltaic string may be prestored in a target table. After the output voltage and an output current of the second photovoltaic string are obtained, the control module in the power conversion apparatus may obtain MPPT efficiency of the second photovoltaic string by querying the target table. Herein, the third threshold may be determined by using an empirical value or test data. If it is determined that the output voltage of the first photovoltaic string is greater than the output voltage of the second photovoltaic string and the comparison value between the two output voltages is greater than the first threshold, determining of the MPPT efficiency of the second photovoltaic string and the third threshold is added, to further verify whether a problem that a voltage difference between the output voltage of the second photovoltaic string and a bus voltage is large exists. This improves accuracy of a determining condition, and correspondingly helps improve pertinence of a subsequent measure. Therefore, operating efficiency of the power conversion apparatus can be effectively improved, and energy can be saved.

Step S704: Determine whether a ripple current of the second photovoltaic string is greater than a fourth threshold. If the ripple current of the second photovoltaic string is not greater than the fourth threshold, return to step S701; or if the ripple current of the second photovoltaic string is greater than the fourth threshold, continue to perform step S705.

In a feasible implementation, the ripple current of the second photovoltaic string may be obtained through sampling. The fourth threshold may be determined based on an empirical value, and is not limited in this application. Generally, when a voltage difference between the output voltage of the first photovoltaic string and the output voltage of the second photovoltaic string is large, and the voltage difference between the output voltage of the second photovoltaic string and the bus voltage is large, the ripple current of the second photovoltaic string is also large. Therefore, detection and determining of the ripple current of the second photovoltaic string are added, to improve accuracy of determining whether the foregoing voltage difference problem exists. This helps improve the pertinence of the subsequent measure. Therefore, the operating efficiency of the power conversion apparatus can be effectively improved, and energy can be saved.

Step S705: Control a switching transistor in the first direct current conversion module to be turned on or off to decrease the output voltage of the first photovoltaic string to a first voltage, and control a switching transistor in the second direct current conversion module to be turned on or off to increase the output voltage of the second photovoltaic string to a second voltage, so that a comparison value between the output voltage of the second photovoltaic string and the bus voltage is less than the second threshold.

In a feasible implementation, as shown in FIG. 5, the output PV curve of the first photovoltaic string and the output PV curve of the second photovoltaic string are respectively shown as the curve L1 and the curve L2. In this case, the voltage corresponding to the left endpoint A1 of the constant power interval A1B1 included in the output PV curve of the first photovoltaic string is greater than or equal to the voltage corresponding to the right endpoint B2 of the constant power interval A2B2 included in the output PV curve of the second photovoltaic string. In this case, the quantity of smart modules included in the first photovoltaic string is greater than the quantity of smart modules included in the second photovoltaic string. In this case, to resolve the foregoing voltage difference problem, the control module in the power conversion apparatus maximally decreases the output voltage of the first photovoltaic string to the voltage corresponding to the point A1 by using the MPPT, and maximally increases the output voltage of the second photovoltaic string to the voltage corresponding to the point B2 by using the MPPT, so that the comparison value between the output voltage of the second photovoltaic string and the bus voltage is less than the second threshold. In this way, if it is maximally ensured that the first photovoltaic string and the second photovoltaic string still output at the respective maximum output powers, the voltage difference between the output voltage of the second photovoltaic string and the bus voltage may be reduced. This improves the operating efficiency of the power conversion apparatus and increases the system energy yield.

In a feasible implementation, as shown in FIG. 6, the output PV curve of the first photovoltaic string and the output PV curve of the second photovoltaic string are respectively shown as a curve L3 and a curve L4. In this case, the voltage corresponding to the right endpoint B4 of the constant power interval A4B4 included in the output PV curve of the second photovoltaic string is greater than or equal to the voltage corresponding to the left endpoint A3 of the constant power interval A3B3 included in the output PV curve of the first photovoltaic string, and is greater than or equal to the voltage corresponding to the right endpoint B3 of the constant power interval A3B3. In this case, the quantity of smart modules included in the first photovoltaic string is greater than or equal to the quantity of smart modules included in the second photovoltaic string. In this case, to resolve the foregoing voltage difference problem, the control module in the power conversion apparatus maximally decreases the output voltage of the first photovoltaic string to the voltage corresponding to the point B3 by using the MPPT, and maximally increases the output voltage of the second photovoltaic string to the voltage corresponding to the point B4 by using the MPPT, so that the comparison value between the output voltage of the second photovoltaic string and the bus voltage is less than the second threshold. In this way, if it is maximally ensured that the first photovoltaic string and the second photovoltaic string still output at the respective maximum output powers, the voltage difference between the output voltage of the second photovoltaic string and the bus voltage may be reduced. This improves the operating efficiency of the power conversion apparatus and increases the system energy yield.

In embodiments of this application, when the output voltage of the first photovoltaic string is greater than the output voltage of the second photovoltaic string and the comparison value between the two output voltages is greater than the first threshold, the control module in the power conversion apparatus determines that the voltage difference between the output voltages of the two photovoltaic strings is large. Correspondingly, the voltage difference between the output voltage of the second photovoltaic string and the bus voltage may also be large. In this case, the control module may control the switching transistor in the first direct current conversion module to be turned on or off to decrease the output voltage of the first photovoltaic string, and control the switching transistor in the second direct current conversion module to be turned on or off to increase the output voltage of the second photovoltaic string, so that the comparison value between the output voltage of the second photovoltaic string and the bus voltage is less than the second threshold. In other words, the control module performs different MPPT on the first photovoltaic string and the second photovoltaic string, so that the voltage difference between the output voltage of the second photovoltaic string and the bus voltage is reduced. In a process in which the control module performs the different MPPT on the first photovoltaic string and the second photovoltaic string, the first photovoltaic string and the second photovoltaic string are still maximally enabled to output at the respective maximum powers, so that the voltage difference between the output voltage of the second photovoltaic string and the bus voltage is further reduced. This can improve the operation efficiency of the power conversion apparatus and increase the energy yield of the photovoltaic system, and is helpful to improve power generation efficiency.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power conversion apparatus, comprising:
   a first direct current conversion circuit having an input end configured to connect to a first photovoltaic string;
   a second direct current conversion circuit having an input end configured to connect to a second photovoltaic string, wherein an output end of the first direct current conversion circuit and an output end of the second direct current conversion circuit are connected in parallel to a direct current bus; and
   a control circuit configured to, in response to an output voltage of the first photovoltaic string being greater than an output voltage of the second photovoltaic string and a comparison value between the output voltage of the first photovoltaic string and the output voltage of the second photovoltaic string being greater than a first threshold:
   control a switching transistor in the first direct current conversion circuit to be turned on or off to decrease the output voltage of the first photovoltaic string and a switching transistor in the second direct current conversion circuit to be turned on or off to increase the output voltage of the second photovoltaic string, so that a comparison value between the output voltage of the second photovoltaic string and a bus voltage of the direct current bus is less than a second threshold.

2. The apparatus according to claim 1, wherein the control circuit is further configured to:
in response to a quantity of smart circuits comprised in the first photovoltaic string being greater than or equal to a quantity of smart circuits comprised in the second photovoltaic string, obtain the output voltage of the first photovoltaic string and the output voltage of the second photovoltaic string, and obtain the comparison value between the output voltage of the first photovoltaic string and the output voltage of the second photovoltaic string, wherein each smart circuit of the smart circuits comprises one photovoltaic circuit and one converter that are connected in series.

3. The apparatus according to claim 2, wherein the control circuit is configured to:
in response to the output voltage of the first photovoltaic string being greater than the output voltage of the second photovoltaic string, the comparison value between the output voltage of the first photovoltaic string and the output voltage of the second photovoltaic string being greater than the first threshold, and a maximum power point tracking (MPPT) efficiency of the second photovoltaic string being less than a third threshold:
control the switching transistor in the first direct current conversion circuit to be turned on or off to decrease the output voltage of the first photovoltaic string and control the switching transistor in the second direct current conversion circuit to be turned on or off to increase the output voltage of the second photovoltaic string, so that the comparison value between the output voltage of the second photovoltaic string and the bus voltage of the direct current bus is less than the second threshold, and the MPPT efficiency of the second photovoltaic string corresponds to the output voltage and an output current of the second photovoltaic string.

4. The apparatus according to claim 2, wherein the control circuit is configured to:
in response to the output voltage of the first photovoltaic string being greater than the output voltage of the second photovoltaic string, the comparison value between the output voltage of the first photovoltaic string and the output voltage of the second photovoltaic string being greater than the first threshold, and a ripple current of the second photovoltaic string being greater than a fourth threshold:
control the switching transistor in the first direct current conversion circuit to be turned on or off to decrease the output voltage of the first photovoltaic string, and control the switching transistor in the second direct current conversion circuit to be turned on or off to increase the output voltage of the second photovoltaic string, so that the comparison value between the output voltage of the second photovoltaic string and the bus voltage of the direct current bus is less than the second threshold.

5. The apparatus according to claim 2, wherein an output power voltage (PV) curve of the first photovoltaic string comprises a first constant power interval, an output PV curve of the second photovoltaic string comprises a second constant power interval, and a voltage corresponding to a right endpoint of the second constant power interval is less than or equal to a voltage corresponding to a left endpoint of the first constant power interval, and the control circuit is further configured to:
control the switching transistor in the first direct current conversion circuit to be turned on or off to decrease the output voltage of the first photovoltaic string to a first voltage, and control the switching transistor in the second direct current conversion circuit to be turned on or off to increase the output voltage of the second photovoltaic string to a second voltage, wherein the first voltage is greater than or equal to the voltage corresponding to the left endpoint of the first constant power interval, and the second voltage is less than or equal to the voltage corresponding to the right endpoint of the second constant power interval.

6. The apparatus according to claim 2, wherein an output power voltage PV curve of the first photovoltaic string comprises a first constant power interval, an output PV curve of the second photovoltaic string comprises a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval, and the control circuit is further configured to:
control the switching transistor in the first direct current conversion circuit to be turned on or off to decrease the output voltage of the first photovoltaic string to a first voltage, and control the switching transistor in the second direct current conversion circuit to be turned on or off to increase the output voltage of the second photovoltaic string to a second voltage, wherein the first voltage is greater than or equal to the voltage corresponding to the right endpoint of the second constant power interval, and the second voltage is less than or equal to the voltage corresponding to the right endpoint of the second constant power interval.

7. The apparatus according to claim 1, wherein the apparatus further comprises an inverter circuit, an input end of the inverter circuit is connected to the direct current bus, and an output end of the inverter circuit is configured to connect to a load, and the inverter circuit is configured to:
receive direct currents that are output from the first photovoltaic string and the second photovoltaic string to the direct current bus, and convert the direct currents into an alternating current to supply power to the load.

8. A method applied to a control circuit in a power conversion apparatus, the power conversion apparatus comprising a first direct current conversion circuit and a second direct current conversion circuit, wherein an input end of the first direct current conversion circuit is configured to connect to a first photovoltaic string, an input end of the second direct current conversion circuit is configured to connect to a second photovoltaic string, and an output end of the first direct current conversion circuit and an output end of the second direct current conversion circuit are connected in parallel to a direct current bus, and the method comprises:
in response to an output voltage of the first photovoltaic string being greater than an output voltage of the second photovoltaic string and a comparison value between the output voltage of the first photovoltaic string and the output voltage of the second photovoltaic string being greater than a first threshold:

controlling a switching transistor in the first direct current conversion circuit to be turned on or off to decrease the output voltage of the first photovoltaic string, and controlling a switching transistor in the second direct current conversion circuit to be turned on or off to increase the output voltage of the second photovoltaic string, so that a comparison value between the output voltage of the second photovoltaic string and a bus voltage of the direct current bus is less than a second threshold.

9. The method according to claim 8, wherein the method further comprises:

in response to a quantity of smart circuits comprised in the first photovoltaic string being greater than or equal to a quantity of smart circuits comprised in the second photovoltaic string, obtaining the output voltage of the first photovoltaic string and the output voltage of the second photovoltaic string to obtain the comparison value between the output voltage of the first photovoltaic string and the output voltage of the second photovoltaic string, wherein each smart circuit of the smart circuits comprises one photovoltaic circuit and one converter that are connected in series.

10. The method according to claim 9, wherein controlling the switching transistor in the first direct current conversion circuit and controlling the switching transistor in the second direct current conversion circuit comprises:

in response to the output voltage of the first photovoltaic string being greater than the output voltage of the second photovoltaic string, the comparison value between the output voltage of the first photovoltaic string and the output voltage of the second photovoltaic string being greater than the first threshold, and a maximum power point tracking (MPPT) efficiency of the second photovoltaic string being less than a third threshold:

controlling the switching transistor in the first direct current conversion circuit to be turned on or off to decrease the output voltage of the first photovoltaic string, and controlling the switching transistor in the second direct current conversion circuit to be turned on or off to increase the output voltage of the second photovoltaic string, so that the comparison value between the output voltage of the second photovoltaic string and the bus voltage of the direct current bus is less than the second threshold, and the MPPT efficiency of the second photovoltaic string corresponds to the output voltage and an output current of the second photovoltaic string.

11. The method according to claim 9, wherein controlling the switching transistor in the first direct current conversion circuit and controlling the switching transistor in the second direct current conversion circuit comprises:

in response to the output voltage of the first photovoltaic string being greater than the output voltage of the second photovoltaic string, the comparison value between the output voltage of the first photovoltaic string and the output voltage of the second photovoltaic string being greater than the first threshold, and a ripple current of the second photovoltaic string being greater than a fourth threshold:

controlling the switching transistor in the first direct current conversion circuit to be turned on or off to decrease the output voltage of the first photovoltaic string, and controlling the switching transistor in the second direct current conversion circuit to be turned on or off to increase the output voltage of the second photovoltaic string, so that the comparison value between the output voltage of the second photovoltaic string and the bus voltage of the direct current bus is less than the second threshold.

12. The method according to claim 9, wherein:

an output power voltage PV curve of the first photovoltaic string comprises a first constant power interval, an output PV curve of the second photovoltaic string comprises a second constant power interval, and a voltage corresponding to a right endpoint of the second constant power interval is less than or equal to a voltage corresponding to a left endpoint of the first constant power interval; and controlling the switching transistor in the first direct current conversion circuit and controlling the switching transistor in the second direct current conversion circuit comprises:

controlling the switching transistor in the first direct current conversion circuit to be turned on or off to decrease the output voltage of the first photovoltaic string to a first voltage, and controlling the switching transistor in the second direct current conversion circuit to be turned on or off to increase the output voltage of the second photovoltaic string to a second voltage, wherein the first voltage is greater than or equal to the voltage corresponding to the left endpoint of the first constant power interval, and the second voltage is less than or equal to the voltage corresponding to the right endpoint of the second constant power interval.

13. The method according to claim 9, wherein:

an output power voltage PV curve of the first photovoltaic string comprises a first constant power interval, an output PV curve of the second photovoltaic string comprises a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval; and controlling the switching transistor in the first direct current conversion circuit and controlling the switching transistor in the second direct current conversion circuit comprises:

controlling the switching transistor in the first direct current conversion circuit to be turned on or off to decrease the output voltage of the first photovoltaic string to a first voltage, and controlling the switching transistor in the second direct current conversion circuit to be turned on or off to increase the output voltage of the second photovoltaic string to a second voltage, wherein the first voltage is greater than or equal to the voltage corresponding to the right endpoint of the second constant power interval, and the second voltage is less than or equal to the voltage corresponding to the right endpoint of the second constant power interval.

14. A power conversion system, comprising:

a first photovoltaic string;

a second photovoltaic string;

a first direct current conversion circuit having an input end connected to the first photovoltaic string;

a second direct current conversion circuit having an input end connected to the second photovoltaic string, wherein an output end of the first direct current conversion circuit and an output end of the second direct current conversion circuit are connected in parallel to a direct current bus; and a control circuit configured to, in response to an output voltage of the first photovoltaic string being greater than an output voltage of the second photovoltaic string and a comparison value between the output voltage of the first photovoltaic string and the output voltage of the second photovoltaic string being greater than a first threshold:

control a switching transistor in the first direct current conversion circuit to be turned on or off to decrease the output voltage of the first photovoltaic string and a switching transistor in the second direct current conversion circuit to be turned on or off to increase the output voltage of the second photovoltaic string, so that a comparison value between the output voltage of the second photovoltaic string and a bus voltage of the direct current bus is less than a second threshold.

15. The system according to claim 14, wherein the control circuit is further configured to:

in response to a quantity of smart circuits comprised in the first photovoltaic string being greater than or equal to a quantity of smart circuits comprised in the second photovoltaic string, obtain the output voltage of the first photovoltaic string and the output voltage of the second photovoltaic string, and obtain the comparison value between the output voltage of the first photovoltaic string and the output voltage of the second photovoltaic string, wherein each smart circuit of the smart circuits comprises one photovoltaic circuit and one converter that are connected in series.

16. The system according to claim 15, wherein the control circuit is configured to:

in response to the output voltage of the first photovoltaic string being greater than the output voltage of the second photovoltaic string, the comparison value between the output voltage of the first photovoltaic string and the output voltage of the second photovoltaic string being greater than the first threshold, and a maximum power point tracking (MPPT) efficiency of the second photovoltaic string being less than a third threshold:

control the switching transistor in the first direct current conversion circuit to be turned on or off to decrease the output voltage of the first photovoltaic string and control the switching transistor in the second direct current conversion circuit to be turned on or off to increase the output voltage of the second photovoltaic string, so that the comparison value between the output voltage of the second photovoltaic string and the bus voltage of the direct current bus is less than the second threshold, and the MPPT efficiency of the second photovoltaic string corresponds to the output voltage and an output current of the second photovoltaic string.

17. The system according to claim 15, wherein the control circuit is configured to:

in response to the output voltage of the first photovoltaic string being greater than the output voltage of the second photovoltaic string, the comparison value between the output voltage of the first photovoltaic string and the output voltage of the second photovoltaic string being greater than the first threshold, and a ripple current of the second photovoltaic string being greater than a fourth threshold:

control the switching transistor in the first direct current conversion circuit to be turned on or off to decrease the output voltage of the first photovoltaic string, and control the switching transistor in the second direct current conversion circuit to be turned on or off to increase the output voltage of the second photovoltaic string, so that the comparison value between the output voltage of the second photovoltaic string and the bus voltage of the direct current bus is less than the second threshold.

18. The system according to claim 15, wherein an output power voltage (PV) curve of the first photovoltaic string comprises a first constant power interval, an output PV curve of the second photovoltaic string comprises a second constant power interval, and a voltage corresponding to a right endpoint of the second constant power interval is less than or equal to a voltage corresponding to a left endpoint of the first constant power interval, and the control circuit is further configured to:

control the switching transistor in the first direct current conversion circuit to be turned on or off to decrease the output voltage of the first photovoltaic string to a first voltage, and control the switching transistor in the second direct current conversion circuit to be turned on or off to increase the output voltage of the second photovoltaic string to a second voltage, wherein the first voltage is greater than or equal to the voltage corresponding to the left endpoint of the first constant power interval, and the second voltage is less than or equal to the voltage corresponding to the right endpoint of the second constant power interval.

19. The system according to claim 15, wherein an output power voltage PV curve of the first photovoltaic string comprises a first constant power interval, an output PV curve of the second photovoltaic string comprises a second constant power interval, a voltage corresponding to a right endpoint of the second constant power interval is greater than or equal to a voltage corresponding to a left endpoint of the first constant power interval, and the voltage corresponding to the right endpoint of the second constant power interval is less than or equal to a voltage corresponding to a right endpoint of the first constant power interval, and the control circuit is further configured to:

control the switching transistor in the first direct current conversion circuit to be turned on or off to decrease the output voltage of the first photovoltaic string to a first voltage, and control the switching transistor in the second direct current conversion circuit to be turned on or off to increase the output voltage of the second photovoltaic string to a second voltage, wherein the first voltage is greater than or equal to the voltage corresponding to the right endpoint of the second constant power interval, and the second voltage is less than or equal to the voltage corresponding to the right endpoint of the second constant power interval.

20. The system according to claim 14, further comprising an inverter circuit, wherein an input end of the inverter circuit is connected to the direct current bus, and an output end of the inverter circuit is configured to connect to a load, and the inverter circuit is configured to:

receive direct currents that are output from the first photovoltaic string and the second photovoltaic string to the direct current bus, and convert the direct currents into an alternating current to supply power to the load.

* * * * *